(12) United States Patent
Higashino

(10) Patent No.: US 7,781,710 B2
(45) Date of Patent: Aug. 24, 2010

(54) IMAGE PICKUP APPARATUS, CONTROL METHOD, AND PROGRAM WITH AUTOFOCUS SELECTION

(75) Inventor: Fuminobu Higashino, Kanagawa (JP)

(73) Assignee: Sony Corporation (JP)

( * ) Notice: Subject to any disclaimer, the term of this patent is extended or adjusted under 35 U.S.C. 154(b) by 1014 days.

(21) Appl. No.: 11/481,479

(22) Filed: Jul. 6, 2006

(65) Prior Publication Data

US 2007/0018069 A1    Jan. 25, 2007

(30) Foreign Application Priority Data

Jul. 6, 2005    (JP)    ............... 2005-197086

(51) Int. Cl.
   *C12Q 1/68*    (2006.01)
(52) U.S. Cl. .............. 250/201.2; 250/201.4; 250/201.8; 396/76; 396/103
(58) Field of Classification Search .............. 250/201.2, 250/201.4, 201.8; 396/76, 103
   See application file for complete search history.

(56) References Cited

U.S. PATENT DOCUMENTS

2005/0168621 A1 *    8/2005    Kageyama et al. .......... 348/349

2006/0008264 A1 *    1/2006    Yamaguchi et al. ......... 396/121

FOREIGN PATENT DOCUMENTS

| JP | 3-099312 A | 4/1991 |
| JP | 4-178815 A | 6/1992 |
| JP | 5-127853 A | 5/1993 |
| JP | 6-113187 A | 4/1994 |
| JP | 8-076927 A | 3/1996 |
| JP | 11-142719 A | 5/1999 |
| JP | 2000-293287 A | 10/2000 |
| JP | 2001-034414 A | 2/2001 |
| JP | 2004-117490 | * 4/2004 |
| JP | 2004-117490 A | 4/2004 |

* cited by examiner

*Primary Examiner*—Seung C Sohn
(74) *Attorney, Agent, or Firm*—Lerner, David, Littenberg, Krumholz & Mentlik, LLP

(57) ABSTRACT

An image pickup apparatus, a control method and a program are provided. The image pickup apparatus includes an imaging module which takes an image; a display module which displays the image taken by the imaging module; a touch panel configured integrally with the display module and manipulatable by a user; a focus frame control module which controls a focus frame in accordance with a manipulation of the touch panel by the user, the focus frame being set at a given position on the image displayed on the display module and being used for focus control; and a focus control module which controls focus based on an image inside the focus frame on the image displayed on the display module.

13 Claims, 8 Drawing Sheets

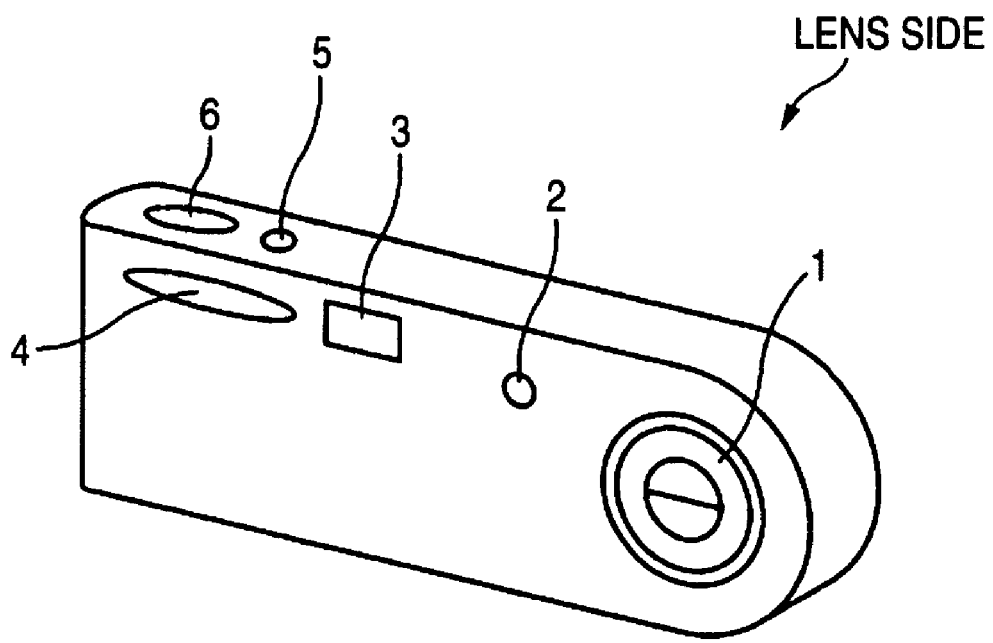
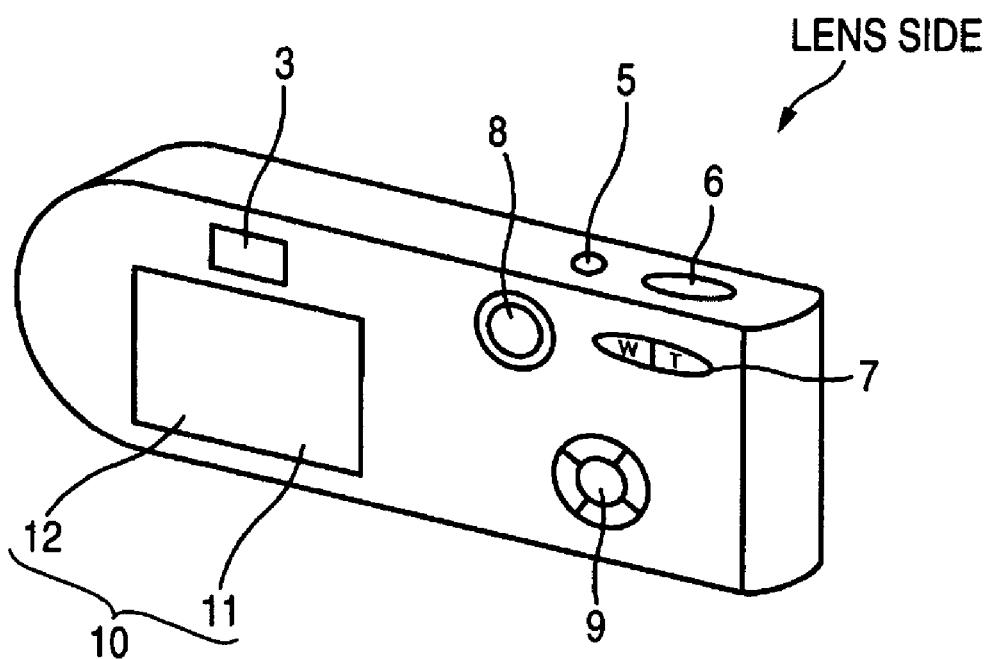
FIG. 1

IMAGE PICKUP APPARATUS, CONTROL METHOD, AND PROGRAM WITH AUTOFOCUS SELECTION

CROSS-REFERENCE TO RELATED APPLICATIONS

The present application claims priority from Japanese Patent Application No. JP 2005-197086 filed on Jul. 6, 2005, the disclosure of which is hereby incorporated by reference herein.

BACKGROUND OF THE INVENTION

1. Field of the Invention

The present invention relates to an image pickup apparatus, a control method, and a program, particularly to an image pickup apparatus, a control method, and a program, which can improve usability.

2. Description of the Related Art

For example, cameras such as a digital (still) camera and a digital video camera generally have a so-called autofocus function.

In the autofocus function, for example, at the center of an image taken by a picture element such as a CCD (Charge Coupled Device) and a CMOS (Complementary Metal Oxide Semiconductor) imager, a focus frame is disposed which is used for focus control, and the focus is controlled in such a way that a high frequency component of the image inside the focus frame is the maximum, that is, the contrast inside the focus frame is the greatest (focus is adjusted).

In the autofocus function before, the focus frame is fixed at the center position of the image taken by the picture element. Therefore, in the cases in which a subject (the image of a subject) to be focused is not inside the focus frame, and the size of a subject inside the focus frame is too small as compared with the size of the focus frame even though it is inside the focus frame, the subject to be focused might not achieve the focus.

Then, for example, the following methods are proposed. The method in which an image taken by a picture element is split into small blocks of a 10 by 10 matrix of pixels, one or more small blocks are specified for a focus frame, and the focus frame in desired size is set at a desired position in a desired shape, and the method in which focus frames are defined in a plurality of patterns, a pattern selection button is operated to select a focus frame used for focus control among the focus frames in the plurality of the patterns, and a scaling button and a cross key (a button for up, down, right and left directions) is operated to further change the position, shape and size of the selected focus frame, as necessary (for example, see JP-A-6-113187).

However, in the method to specify one or more small blocks to be the focus frame and to set the focus frame, it is necessary to specify a small block one by one or multiple blocks by multiple blocks in order to configure a desired focus frame, which hardly has excellent usability. In addition, since the minimum unit of configuring the focus frame is a small block of a 10 by 10 matrix of pixels, the position and size of the focus frame are limited by that small block. For example, it is difficult to set the focus frame at the position at which the border of the focus frame is not matched with the border of the small block. Furthermore, the focus frame can be moved only in a unit of ten pixels which is the matrix size of the small block.

In addition, in the method in which the focus frame used for focus control is selected by operating the pattern selection button, and the position, shape and size of the selected focus frame are changed by manipulating the scaling button and the cross key, as necessary, various manipulations have to be done for setting the focus frame at a desired position, for example, which hardly has excellent usability.

SUMMARY OF THE INVENTION

The invention has been made in view of the circumstances. It is desirable to improve usability, particularly, operational ease of setting a focus frame.

An image pickup apparatus according to an embodiment of the invention includes an imaging module which takes an image; a display module which displays the image taken by the imaging module; a touch panel configured integrally with the display module and manipulatable by a user; a focus frame control module which controls a focus frame in accordance with a manipulation of the touch panel by the user, the focus frame being set at a given position on the image displayed on the display module and being used for focus control; and a focus control module which controls focus based on an image inside the focus frame on the image displayed on the display module.

A control method according to an embodiment of the invention is a control method of an image pickup apparatus having an imaging module which takes an image; a display module which displays the image taken by the imaging module; and a touch panel configured integrally with the display module and manipulatable by a user, the method including controlling a focus frame in accordance with a manipulation of the touch panel by the user, the focus frame being set at a given position on the image displayed on the display module and being used for focus control; and controlling focus based on an image inside the focus frame on the image displayed on the display module.

A program according to an embodiment of the invention is a program which runs a process by a computer that controls an image pickup apparatus having an imaging module which takes an image; a display module which displays the image taken by the imaging module; and a touch panel configured integrally with the display module and manipulatable by a user, the process including controlling a focus frame in accordance with a manipulation of the touch panel by the user, the focus frame being set at a given position on the image displayed on the display module and being used for focus control; and controlling focus based on an image inside the focus frame on the image displayed on the display module.

In an image pickup apparatus, a control method, or a program according to an embodiment of the invention, a focus frame is set at a given position on the image displayed on the display module, and is used for focus control. The focus frame is controlled in accordance with a manipulation of the touch panel by a user, and the focus is controlled based on an image inside the focus frame on the image displayed on the display module.

According to an embodiment of the invention, operational ease of setting the focus frame can be improved.

BRIEF DESCRIPTION OF THE DRAWINGS

The teachings of the invention can be readily understood by considering the following detailed description in conjunction with the accompanying drawings, in which:

FIG. 1 shows a perspective view depicting an exemplary configuration of the appearance of an embodiment of a digital camera to which an embodiment of the invention is applied;

DETAILED DESCRIPTION

Hereinafter, embodiments of the invention will be described. The following is examples of the correspondence between configuration requirements for the invention and the embodiments of the detailed description of the invention. This is described for confirming that the embodiments supporting the invention are described in the detailed description of the invention. Therefore, even though there is an embodiment that is described in the detailed description of the invention but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 2:
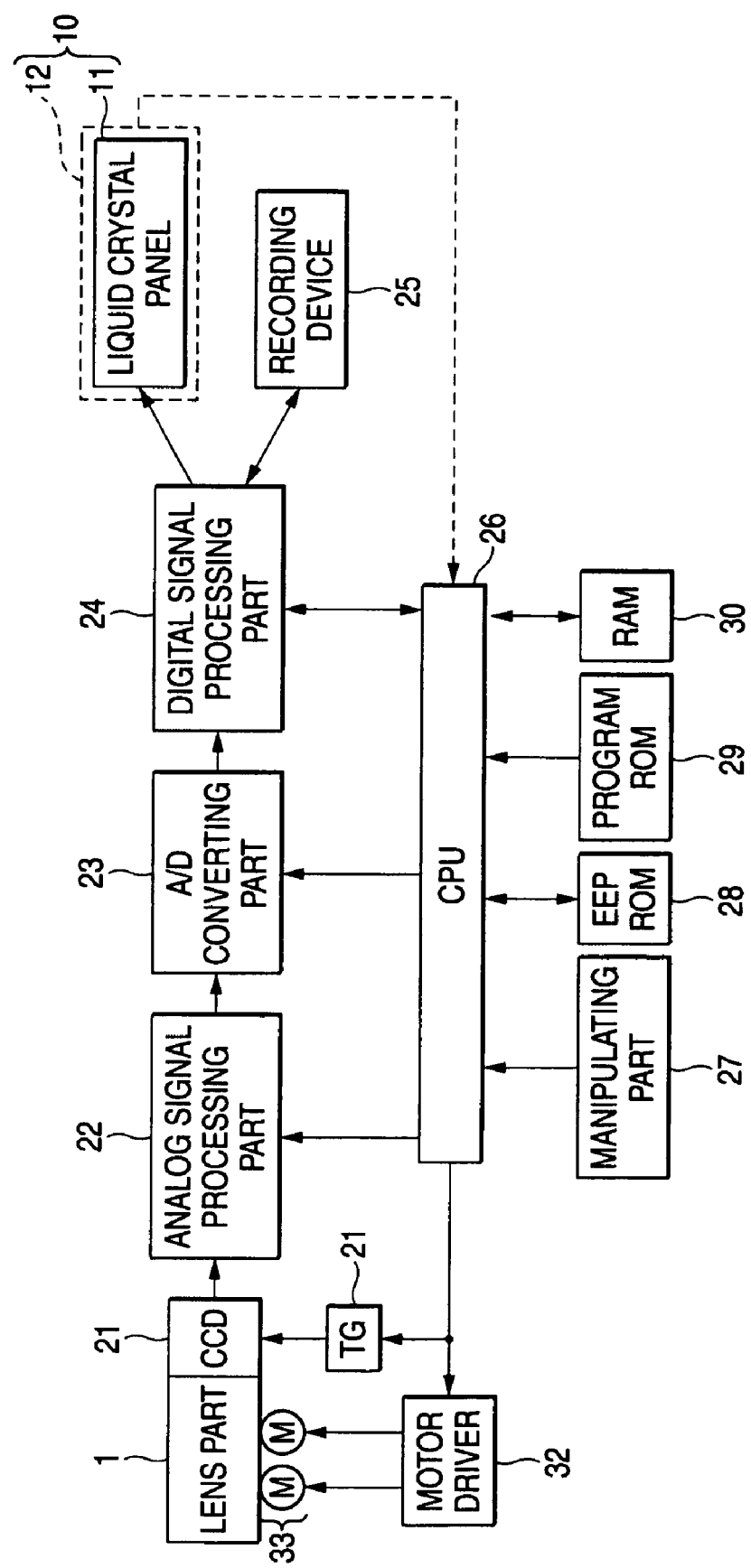
FIG. 2 shows a block diagram depicting an exemplary internal configuration of an embodiment of the digital camera to which an embodiment of the invention is applied.
Figure 3:
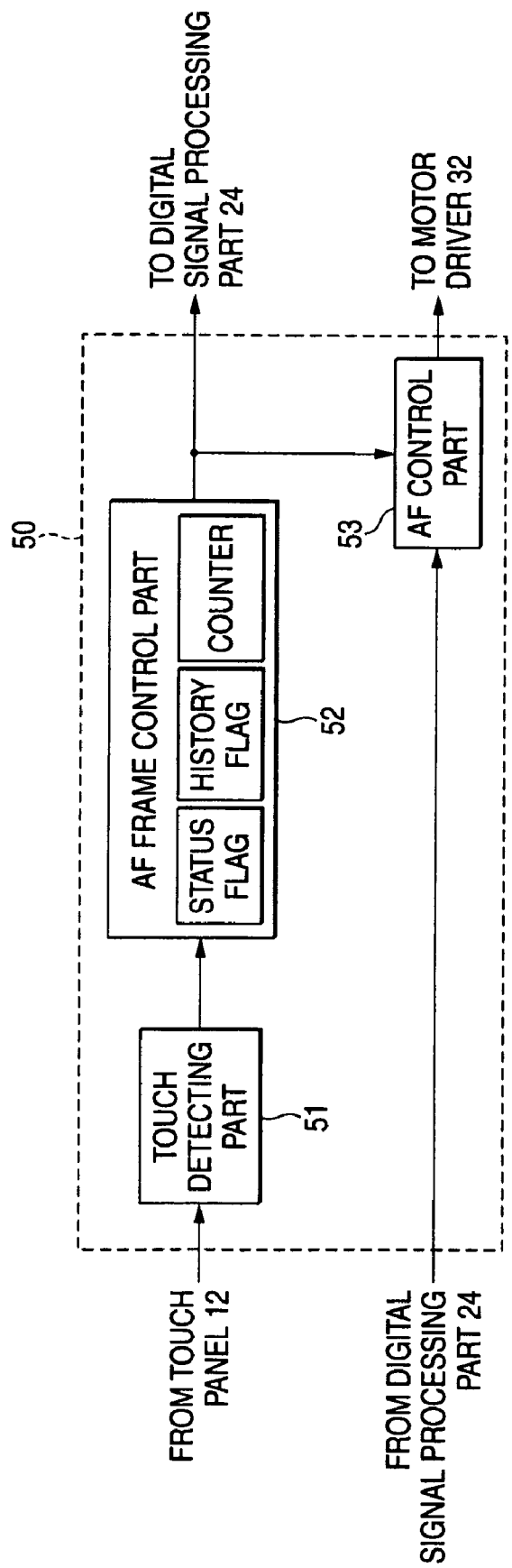
FIG. 3 shows a block diagram depicting an exemplary functional configuration of an AF processing part 50.

First, an image pickup apparatus according to an embodiment of the invention is an image pickup apparatus (for example, a digital camera shown in FIG. 2) including: an imaging module which takes an image (for example, a CCD 21 shown in FIG. 2); a display module which displays the image taken by the imaging module (for example, a liquid crystal panel 11 shown in FIG. 2); and a touch panel which is configured integrally with the display module and which is manipulated by a user (for example, a touch panel 12 shown in FIG. 2), the image pickup apparatus further includes: a focus frame control module which controls a focus frame in accordance with a manipulation of the touch panel by the user, the focus frame which is set at a given position on the image displayed on the display module and which is used for focus control (for example, an AF frame control part 52 shown in FIG. 3); and a focus control module which controls focus based on an image inside the focus frame in the image displayed on the display module (for example, an AF control part 53 shown in FIG. 3).

Figure 7:
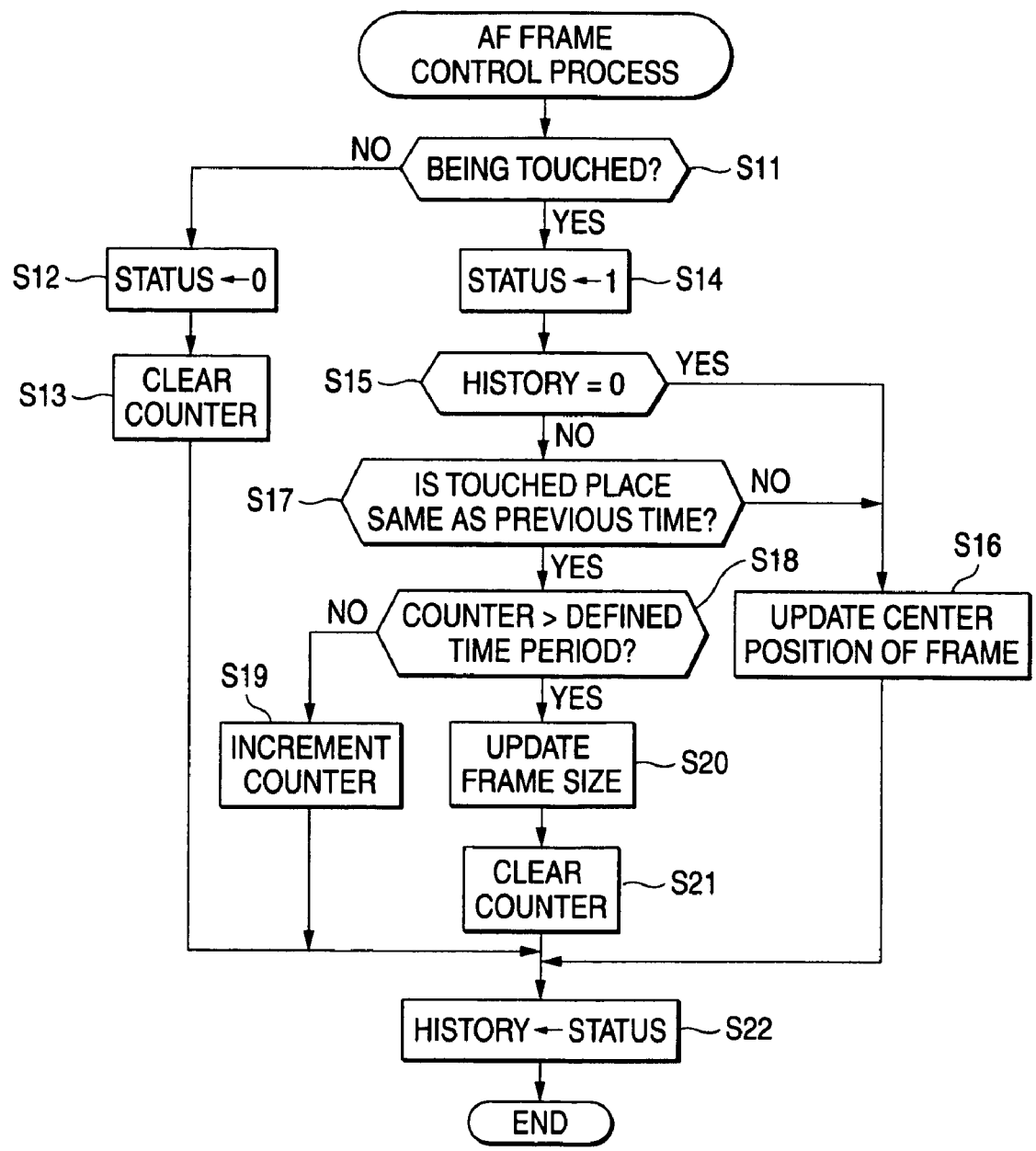
FIG. 7 shows a flow chart illustrative of an AF frame control process.
Figure 8:
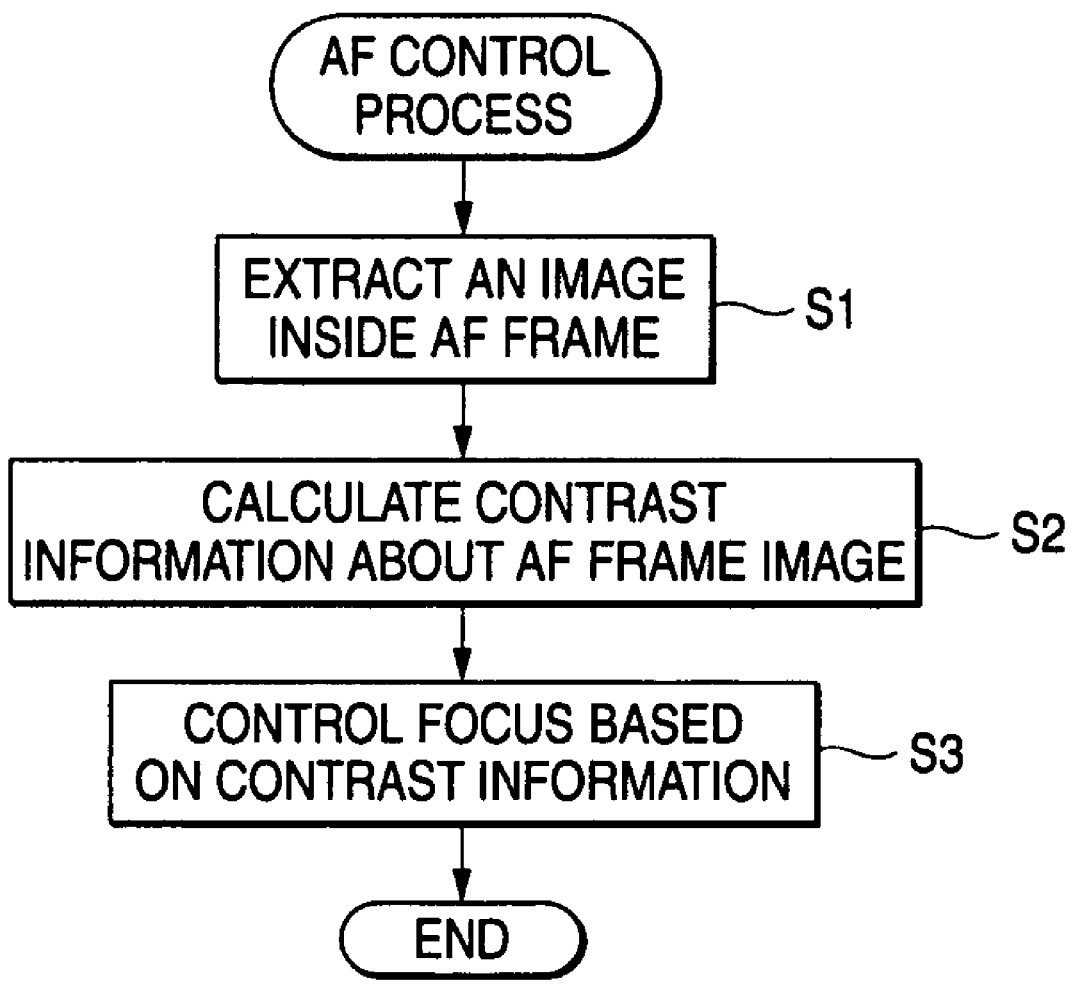
FIG. 8 shows a flow chart illustrative of an AF control process.

A control method or a program according to an embodiment of the invention is a control method of an image pickup apparatus (for example, the digital camera shown in FIG. 2) including an imaging module which takes an image (for example, the CCD 21 shown in FIG. 2) a display module which displays the image taken by the imaging module (for example, the liquid crystal panel 11 shown in FIG. 2); and a touch panel which is configured integrally with the display module and which is manipulated by a user (for example, the touch panel 12 shown in FIG. 2), or a program which runs a process by a computer that controls the image pickup apparatus, the method and the process of the program including the steps of: controlling a focus frame in accordance with a manipulation of the touch panel by the user, the focus frame which is set at a given position on the image displayed on the display module and which is used for focus control (for example, an AF frame control process shown in FIG. 7); and controlling focus based on an image inside the focus frame in the image displayed on the display module (for example, an AF control process shown in FIG. 8).

Hereinafter, an embodiment of the invention will be described with reference to the drawings.

FIG. 1 shows a perspective view depicting an exemplary configuration of the appearance of an embodiment of a digital camera to which an embodiment of the invention is applied.

In addition, a digital camera is shown on the upper side in FIG. 1 as the front (the lens side facing a subject) is frontward, and it is shown on the lower side in FIG. 1 as the back side (the panel side facing a user (operator) of the digital camera) is frontward.

Facing toward the drawing, on the right side of the front of the digital camera (the upper side in FIG. 1), a lens part 1 is disposed. The lens part 1 is formed of an optical system including a lens which collects lights from a subject, a focus lens which adjusts focus, and a diaphragm, and other elements (they are all not shown). The lens part is configured which is exposed out of a case of the digital camera when a power source of the digital camera is turned on whereas it is housed inside the case of the digital camera when the power source of the digital camera is turned off. In FIG. 1, the lens part 1 is in the state in which it is housed inside the case of the digital camera.

Facing toward the drawing, on the upper right side of the center in the front of the digital camera, an AF (AutoFocus) fill light projecting part 2 is disposed. The AF fill light projecting part 2 emits light as AF fill light toward the optical axis direction of the optical system of the lens part 1 to illuminate the subject. Thus, for example, it is configured to work a so-called autofocus function that takes an image of the subject even in a dark place and achieves focus on the subject based on the image.

Facing toward the drawing, on the upper left side of the center in the front of the digital camera, a viewfinder 3 is disposed which continues to the back side of the digital camera. On the left of the viewfinder 3, a flash 4 is disposed.

On the left side of the upper part of the digital camera seen from the front side, a power source switch 5 is disposed which is manipulated when the power source is turned on/off, and a shutter button (release button) 6 is disposed which is operated when an image is recorded.

Facing toward the drawing, on the upper right side of the back side of the digital camera (on the lower side in FIG. 1), a zoom button 7 is disposed which is manipulated when the magnification of zooming is adjusted. On the left side and the lower side of the zoom button 7, a mode dial 8 and a manipulation button 9 are disposed, respectively. The mode dial 8 is manipulated when the modes of the digital camera are selected such as a mode that forcefully turns on/off light emission of the flash 4, a mode that uses a self-timer, and a mode that displays a menu screen on a liquid crystal panel 11, described later. The manipulation button 9 is manipulated at such a time when a cursor is moved to select items of the menu screen displayed on the liquid crystal panel 11, or when a confirmation is made for selecting an item.

A touch screen 10 is a device that combines the liquid crystal panel 11 with a touch panel 12 in one piece, which various images are displayed on the liquid crystal panel 11 and user operation can be accepted with the touch panel 12.

Next, FIG. 2 shows an exemplary internal configuration of the digital camera shown in FIG. 1.

In addition, in FIG. 2, the AF fill light projecting part 2, the viewfinder 3, and the flash 6 shown in FIG. 1 are omitted in the drawing.

A CCD (Charge Coupled Device) 21 is manipulated in response to a timing signal supplied from a timing generator (TG) 31 to receive the light from the subject coming through the lens part 1 for photoelectric conversion, and supplies an analog image signal as an electrical signal in accordance with the received light quantity to an analog signal processing part 22.

The analog signal processing part 22 performs analog signal processing such as amplification for the analog image signal from the CCD 21 in accordance with control done by a CPU (Central Processing Unit) 26, and supplies an image signal resulted from the analog signal processing to an A/D (Analog/Digital) converting part 23.

The A/D converting part 23 performs A/D conversion of the analog image signal from the analog signal processing part 22 in accordance with control done by the CPU 26, and supplies image data of the resulted digital signal to a digital signal processing part 24.

The digital signal processing part 24 performs digital signal processing such as noise cancellation processing for the image data from the A/D converting part 23 in accordance with control done by the CPU 26, and supplies it to the liquid crystal panel 11 for display. In addition, the digital signal processing part 24 compresses the image data from the A/D converting part 23 by JPEG (Joint Photographic Experts Group) mode, for example, and supplies the resulted compressed image data to a recording device 25 for recording. Furthermore, the digital signal processing part 24 expands the compressed image data recorded in the recording device 25, and supplies the resulted image data to the liquid crystal panel 11 for display. In addition to this, the digital signal processing part 24 creates an image of an AF frame (a focus frame) used for focus control in accordance with control done by the CPU 26, and supplies it to the liquid crystal panel 11 for display.

The recording device 25 is a removable recording medium such as a disc including a DVD (Digital Versatile Disc), a semiconductor memory including a memory card and other devices, which is easily detachable from the digital camera.

The CPU 26 runs a program recorded in a program ROM (Read Only Memory) 29 to control each part configuring the digital camera, and runs various processes in response to a signal from the touch panel 12 and a signal from a manipulating part 27.

The manipulating part 27 is manipulated by a user to supply a signal associated with that manipulation to the CPU 26. In addition, the manipulating part 27 corresponds to the power source switch 5, the shutter button 6, the zoom button 7, and the mode dial 8 shown in FIG. 1.

An EEPROM (Electrically Erasable Programmable ROM) 28 stores data that has to be held even when the power source of the digital camera is turned off in accordance with control done by the CPU 26, the data including various items of information set in the digital camera and other information.

The program ROM 29 stores a program run by the CPU 26 as well as data necessary to run the program by the CPU 26. A RAM (Read Only Memory) 30 temporarily stores a program and data necessary to run various processes by the CPU 26.

The timing generator 31 supplies a timing signal to the CCD 21 in accordance with control done by the CPU 26. The timing signal supplied from the timing generator 31 to the CCD 21 controls an exposure time period (shutter speed) and other time periods in the CCD 21.

A motor driver 32 drives an actuator (motor) 33 in accordance with control done by the CPU 26. The actuator 33 is driven to cause the lens part 1 to be exposed out of the case of the digital camera, or to be housed inside the case of the digital camera. In addition, the actuator 33 is driven to adjust the diaphragm configuring the lens part 1 and to move the focus lens configuring the lens part 1.

In the digital camera thus configured, the CCD 21 receives the incoming light from the subject through the lens part 1 for photoelectric conversion, and outputs the resulted analog image signal. The analog image signal outputted from the CCD 21 is made to be image data of the digital signal through the analog signal processing part 22 and the A/D converting part 23, and is supplied to the digital signal processing part 24.

The digital signal processing part 24 supplies the image data from the A/D converting part 23 to the liquid crystal panel 11, and thus a so-called through-image is displayed on the liquid crystal panel 11.

After that, when a user manipulates the shutter button 6 (FIG. 1), the signal associated with that manipulation is supplied from the manipulating part 27 to the CPU 26. When the signal associated with the manipulation of the shutter button 6 is supplied from the manipulating part 27, the CPU 26 controls the digital signal processing part 24 to compress image data supplied from the A/D converting part 23 to the digital signal processing part 24 and to record the resulted compressed image data in the recording device 25.

As described above, a so-called photograph is taken.

In addition, the program run by the CPU 26 is installed (stored) in the program ROM 29 beforehand. In addition to this, this scheme may be done in which it is recorded in the recording device 25, offered as a package medium for the user, and installed from the recording device 25 to the EEPROM 28 through the digital signal processing part 24 and the CPU 26. In addition, this scheme may be done as well in which the program run by the CPU 26 is directly downloaded from a download site to the digital camera shown in FIG. 2, or downloaded to a computer, not shown, supplied to the digital camera shown in FIG. 2, and installed in the EEPROM 28.

Next, the digital camera shown in FIG. 2 has an autofocus function. In the autofocus function, the AF frame (detection frame) is set on an image taken by the CCD 21, and the focus is controlled (the focus lens is moved) based on the image inside the AF frame.

Furthermore, in the autofocus function of the digital camera shown in FIG. 2, the AF frame is configured which can be set at a given position on the image displayed on the liquid crystal panel 11, and control over the position and size thereof can be done only by manipulation over the touch panel 12 configured integrally with the liquid crystal panel 11.

In the digital camera shown in FIG. 2, an AF process for the autofocus function is done by running the program by the CPU 26.

Then, FIG. 3 shows an exemplary functional configuration of the AF processing part 50 which performs the AF process. In addition, the AF processing part 50 is implemented in a so-called virtual manner by running the program by the CPU 26.

The AF processing part 50 is configured of a touch detecting part 51, an AF frame control part 52, and an AF control part 53.

To the touch detecting part 51, a signal is supplied from the touch panel 12 of the touch screen 10. The touch detecting part 51 detects the descriptions of user manipulation with respect to the touch screen 10 (the touch panel 12 of the touch screen 10) based on the signal from the touch screen 10 (the touch panel 12 of the touch screen 10), and supplies manipulation information showing the descriptions of the manipulation to the AF frame control part 52.

The AF frame control part 52 controls the AF frame set at a given position on the image displayed on the liquid crystal panel 11 of the touch screen 10 in accordance with manipulation information from the touch detecting part 51, and supplies information about the AF frame (hereinafter, properly called AF frame information) to the digital signal processing part 24 (FIG. 2) and the AF control part 53.

Here, when the digital signal processing part 24 (FIG. 2) receives AF frame information supplied from the AF frame control part 52, it creates an AF frame (an image of an AF frame) expressed by the AF frame information. Furthermore, the digital signal processing part 24 superimposes the AF frame (the image of the AF frame) on data of an image that is taken by the CCD 21 and supplied from the A/D converting part, and supplies it to the touch screen 10 (the liquid crystal panel 11 of the touch screen 10) for display. Therefore, on the touch screen 10 (the liquid crystal panel 11 of the touch screen 10), the AF frame is displayed along with the image taken by the CCD 21.

Consequently, a user simply views the display on the touch screen 10 to easily confirm on which part the AF frame is set on the image taken by the CCD 21.

In addition, the AF frame control part 52 has a status flag, a history flag, and a counter therein. In the embodiment, the status flag, the history flag, and the counter are used to control the AF frame.

The AF control part 53 is configured to receive AF frame information from the AF frame control part 52 thereto as well as data of the image taken by the CCD 21 from the digital signal processing part 24 (FIG. 1). The AF control part 53 creates a focus control signal for focus control based on image data inside the AF frame specified by AF frame information from the AF frame control part 52 in image data from the digital signal processing part 24, and supplies it to the motor driver 32 (FIG. 1).

More specifically, the AF control part 53 creates a focus control signal that moves the focus lens of the lens part 1 in the direction in which the high frequency component of image data inside the AF frame becomes greater in the image data from the digital signal processing part 24, and supplies it to the motor driver 32.

Here, the motor driver 32 drives the actuator 33 in response to the focus control signal from the AF control part 53, and thus the focus lens is moved in the direction in which the high frequency component of the image data inside the AF frame becomes greater.

Next, AF frame control done by the AF control part 52 of the AF processing part 50 shown in FIG. 3 will be described with reference to FIGS. 4 to 6.

When the power source of the digital camera is turned on, for example, the AF frame control part 52 displays the AF frame in the default size on the touch screen 10 at the barycenter of the image displayed on the touch screen 10 (the liquid crystal panel 11 of the touch screen 10) as the default position. More specifically, the AF frame control part 52 supplies AF frame information including the default position and default size of the AF frame to the digital signal processing part 24. The digital signal processing part 24 creates an image of the AF frame in accordance with AF frame information from the AF frame control part 52, and supplies it to the touch screen 10 (the liquid crystal panel 11 of the touch screen 10). Thus, the AF frame in the default size is displayed at the default position on the touch screen 10. In addition, for another AF frame right after the power source is turned on, an AF frame may be adopted that is the same as the AF frame displayed right before the power source is turned off, for example.

Figure 4:
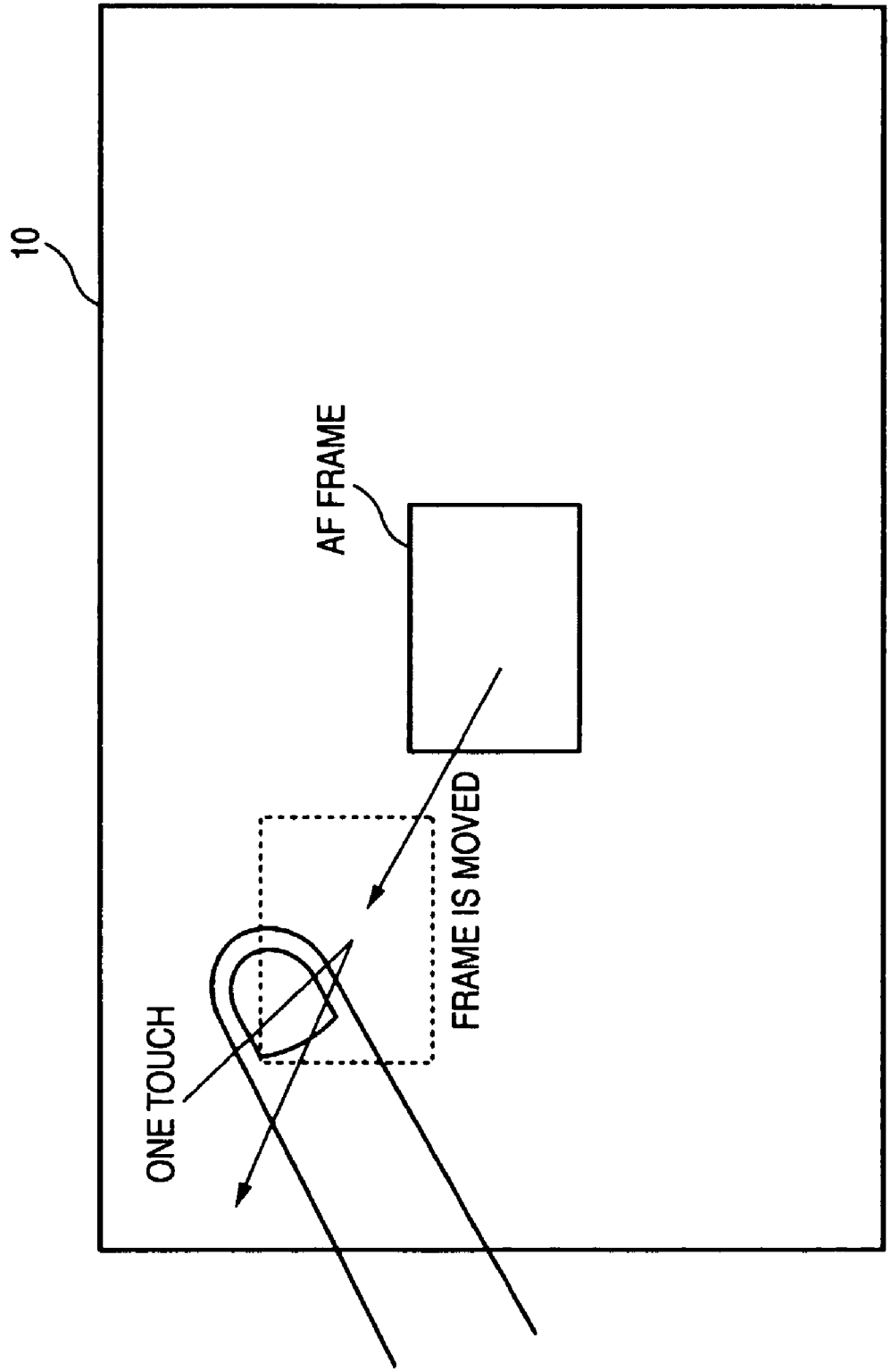
FIG. 4 shows a diagram depicting a manner of moving an AF frame.

FIG. 4 shows the state in which the AF frame in the default size is displayed at the default position on the touch screen 10.

The AF frame has a landscape rectangular shape, for example, and is displayed so that its barycenter position is matched with the default position at the default size.

After that, when a user touches a certain position on the touch screen 10 (the touch panel 12 of the touch screen 10), that is, when the user makes one touch at a certain position on the touch screen 10 and moves his/her finger off, the AF frame control part 52 instantaneously moves the AF frame to the position at which the user has made one touch as shown by a dotted lien in FIG. 4.

More specifically, when the user makes one touch at a certain position on the touch screen 10, manipulation information including the position at which the user has made one touch is supplied from the touch detecting part 51 to the AF frame control part 52. The AF frame control part 52 supplies AF frame information including the position (the position at which the user has made one touch) included in manipulation information from the touch detecting part 51 and the current size of the AF frame to the digital signal processing part 24. The digital signal processing part 24 creates an image of the AF frame in accordance with the AF frame information from the AF frame control part 52, and supplies it to the touch screen 10. On the touch screen 10, as shown by a doted line in FIG. 4, the AF frame is displayed at the position at which the user has made one touch as the size is maintained. In this case, the AF frame is to be instantaneously moved to the position at which the user has made one touch.

In addition, when a user moves the touched position while he/she is touching on the touch screen 10, the AF frame control part 52 moves the AF frame in accordance with the user moving the touched position.

Figure 5:
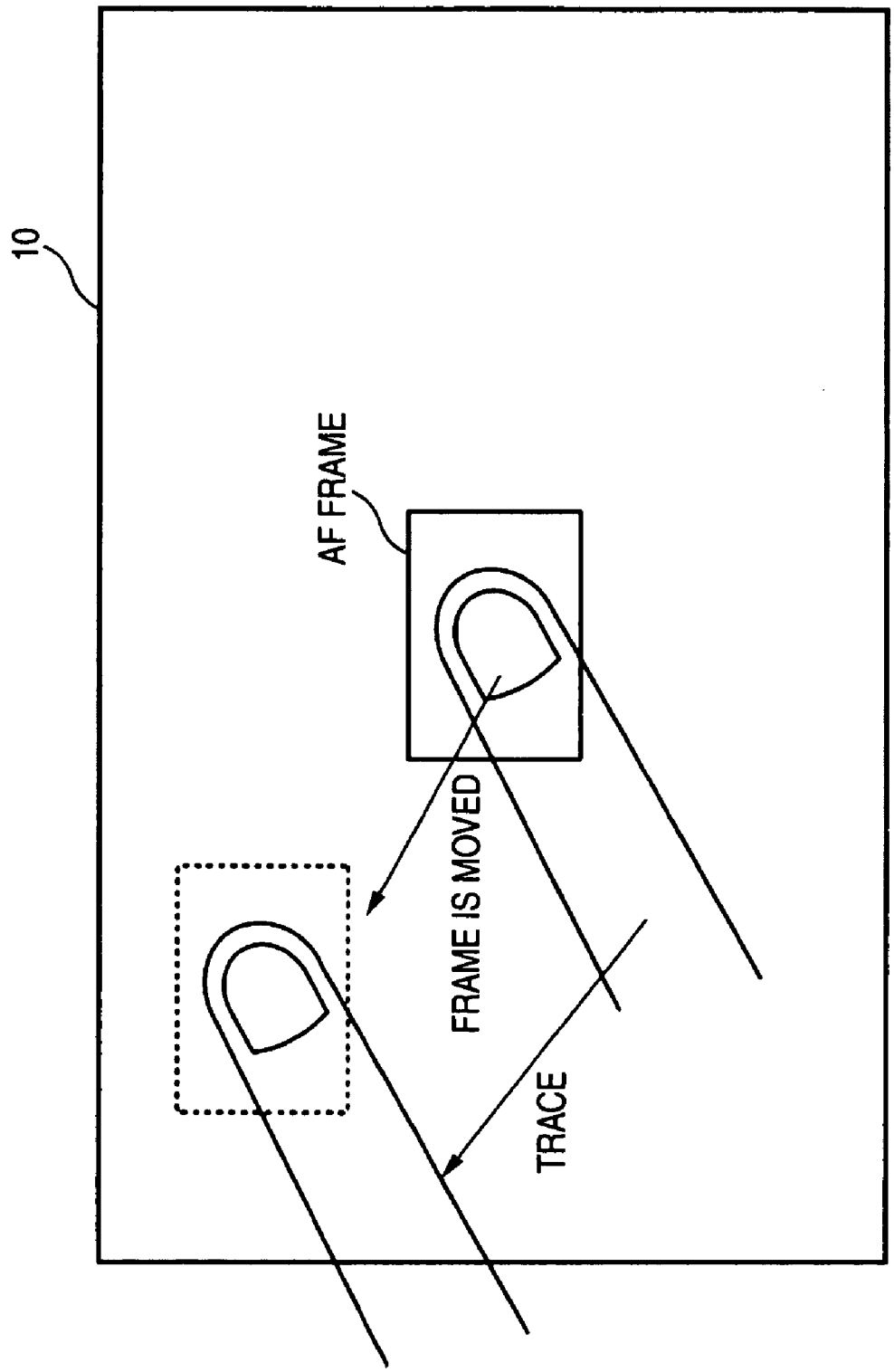
FIG. 5 shows a diagram depicting a manner of moving an AF frame.

More specifically, FIG. 5 shows the manner of moving the AF frame when the user moves the touched position while he/she is touching on the touch screen 10.

When the user moves the touched position while he/she is touching on the touch screen 10, manipulation information including the position after moved is supplied from the touch detecting part 51 to the AF frame control part 52. The AF frame control part 52 supplies AF frame information including the position included in manipulation information from the touch detecting part 51 and the current size of the AF frame to the digital signal processing part 24. The digital signal processing part 24 creates an image of the AF frame in accordance with the AF frame information from the AF frame control part 52, and supplies it to the touch screen 10.

The supply from the touch detecting part 51 to the AF frame control part 52 of manipulation information including the position touched by the user (the touched position) after the touched position is moved, the supply of the AF frame information from the AF frame control part 52 to the digital signal processing part 24, and the supply of the image of the AF frame from the digital signal processing part 24 to the touch screen 10 described above are repeatedly done until the user finishes moving the touched position. Consequently, on the touch screen 10, as shown in FIG. 5, the AF frame is displayed while it is moving in accordance with the move of the position touched by the user as it maintains its size.

After that, when the user stops touching on the touch screen 10, for example, the supply of manipulation information from the touch detecting part 51 to the AF frame control part 52 is stopped. On the touch screen 10, the AF frame is displayed at the position at which the user stops touching.

Therefore, in the digital camera shown in FIG. 2, the AF frame can be set at a given position on the image displayed on the touch screen 10 (the liquid crystal panel 11 of the touch screen 10).

More specifically, the AF frame is displayed at the position included in manipulation information, for example, it is displayed so that the barycenter position of the rectangular AF frame is matched. Thus, the AF frame can be set at a given position on the image displayed on the touch screen 10.

Consequently, the position of the AF frame is not limited by a small block as in the method of above described Patent Reference 1, for example, in which the image taken by the picture element is split into small blocks, one or more of small blocks are specified for the AF frame, and the AF frame is set at a certain position.

More specifically, according to the method described in Patent Reference 1, as described above, it is difficult to set the AF frame at the position at which the border of the AF frame is not matched with the border of a small block because the AF frame is set in a unit of a small block. Contrary to this, in the digital camera shown in FIG. 2, the AF frame is set so that its barycenter position is matched with the position included in manipulation information. Therefore, within the range of the detection accuracy of the position on the touch panel 12 of the touch screen 10, the AF frame can be set at the position smoothly in a so-called non-stop manner. Consequently, the AF frame can be moved as well smoothly in a so-called non-stop manner.

In addition, in the case in which the user moves the touched position while he/she is touching on the touch screen 10, the AF frame may be moved in such manners that the barycenter position of the AF frame is matched with each position on a trace along the trace of the move of the touched position, or that it is moved in substantially parallel with the trace of the move of the touched position from the current position.

Here, in the case in which the AF frame is moved in such a manner that the barycenter position of the AF frame is matched with each position on a trace along the trace of the move of the touched position, the AF frame is moved in such a way that it follows the position touched by the user on the touch screen 10. On the other hand, in the case in which the AF frame is moved in parallel with the trace of the move of the touched position from the current position, when the user touches at a given position on the touch screen 10 and moves the touched position, the AF frame is moved in such a way that it draws the trace of the move of the touched position from the current position.

More specifically, for example, suppose the user now touches on the touch screen 10 by the finger and moves the touched position. In the case in which the AF frame is moved in such a manner that the barycenter position of the AF frame is matched with each position on a trace along the trace of the move of the touched position, the AF frame is moved in such a way that it sticks and follows the user's finger touching on the touch screen 10. In addition, in the case in which the AF frame is moved in parallel with the trace of the move of the touched position from the current position, when the user traces with the finger the place other than the part in which the AF frame is displayed on the touch screen 10, the AF frame is moved in such a way that it draws the same trace as the trace drawn by the finger while it is apart from the user's finger touching the touch screen 10.

As described above, the user can set the AF frame at a given position on the image displayed on the touch screen 10 (the liquid crystal panel 11 of the touch screen 10) only by making one touch on the touch screen 10 (the touch panel 12 of the touch screen 10), or by moving the touched position while he/she is touching on the touch screen 10. Therefore, operational ease of setting the AF frame can be improved.

As described above, the user can move the position of the AF frame by touching on the touch screen 10. In addition to this, the size of the AF frame may be changed.

More specifically, in the case in which the user does not move the touched position for a predetermined time period while he/she is touching on the touch screen 10, the AF frame control part 52 changes the size of the AF frame.

More specifically, when the user does not move the touched position while he/she is touching on the touch screen 10, manipulation information about the touched position not changed is supplied from the touch detecting part 51 to the AF frame control part 52. When manipulation information about the touched position not changed is continuously supplied from the touch detecting part 51 for a predetermined number of times, the AF frame control part 52 supplies AF frame information including the current position of the AF frame and the size different from the current size of the AF frame to the digital signal processing part 24. The digital signal processing part 24 creates an image of the AF frame in accordance with the AF frame information from the AF frame control part 52, and supplies it to the touch screen 10.

The AF frame control part 52 supplies AF frame information including the current position of the AF frame and the size different from the current size of the AF frame to the digital signal processing part 24 at each time when manipulation information about the touched position not changed is continuously supplied from the touch detecting part 51 for a predetermined number of times. Therefore, when the user does not move the touched position while he/she is touching on the touch screen 10, the AF frame control part 52 supplies AF frame information including the current position of the AF frame and the size different from the current size of the AF frame to the digital signal processing part 24 at each time when a predetermined time period has elapsed that is necessary to continuously supply manipulation information about the touched position not changed for a predetermined number of times from the touch position detecting part 51 to the AF frame control part 52.

Consequently, on the touch screen 10, the AF frame changed in the size is displayed at each time when a predetermined time period has elapsed.

After that, when the user stops touching on the touch screen 10, for example, the supply of manipulation information from the touch detecting part 51 to the AF frame control part 52 is stopped, and on the touch screen 10, the AF frame is displayed in the size when the user stops touching on the touch screen 10.

Therefore, the user can change the size of the AF frame only by keeping touching on the touch screen 10 (the touch panel 12 of the touch screen 10). More specifically, in changing the size of the AF frame, it is unnecessary to do various manipulations as in the method of above described Patent Reference 1, for example, in which the pattern selection button is manipulated and the scaling button and the cross key are further manipulated.

Figure 6:
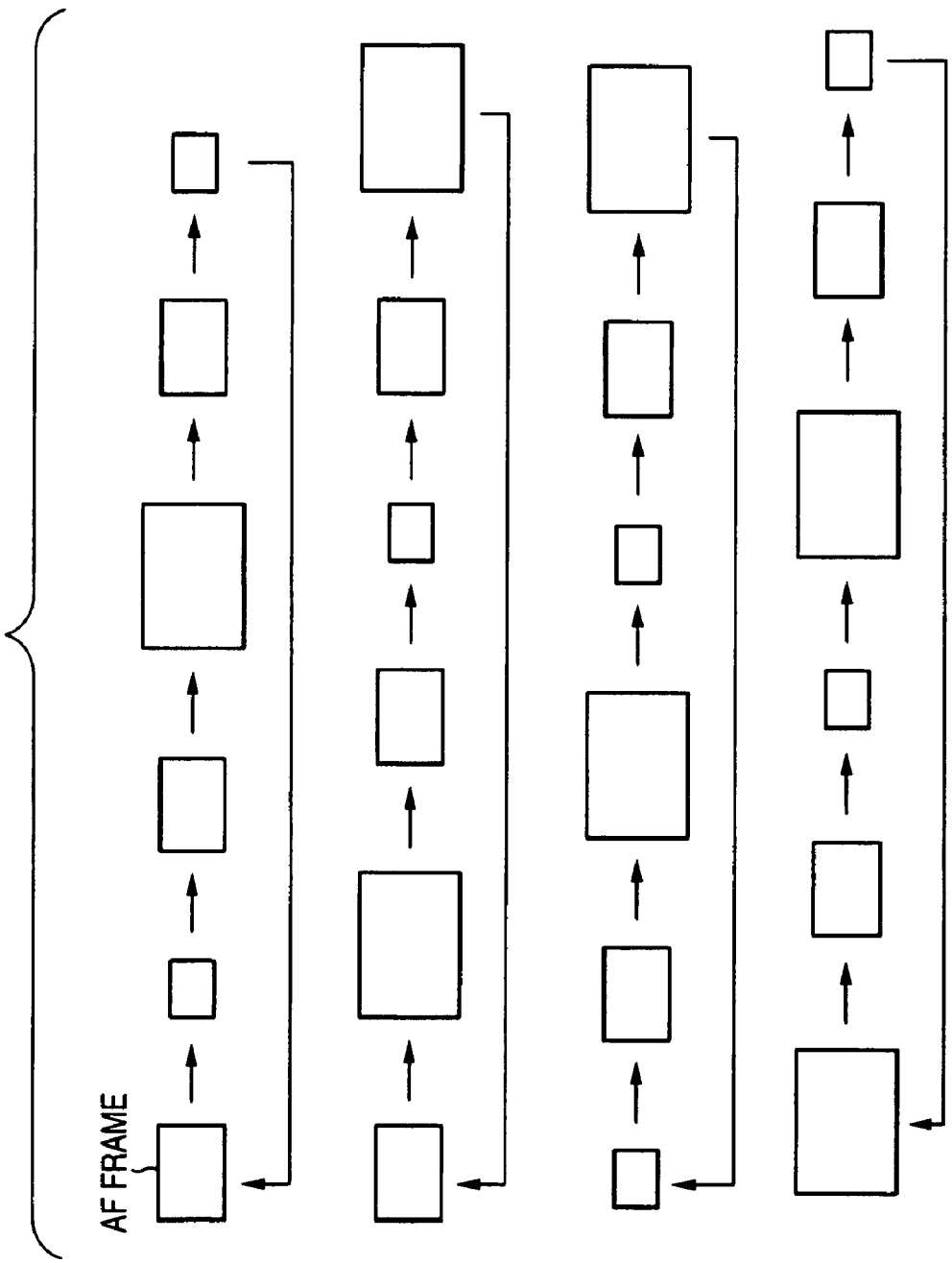
FIG. 6 shows a diagram depicting a manner of changing the size of the AF frame.

Here, FIG. 6 shows an exemplary manner of changing the size of the AF frame in the case in which the user does not move the touched position while he/she is touching on the touch screen 10.

In addition, in FIG. 6, for the size of the AF frame, three types of frames, large, middle and small-sized frames, are prepared.

In the uppermost row shown in FIG. 6, when the AF frame in the middle size is a default AF frame (an AF frame displayed when the power source is turned on) and this state is continued for a predetermined time period that a user does not move the touched position while he/she is touching on the touch screen 10 (hereinafter, properly called a stationary state), the size of the AF frame is changed from the middle size to the small size. Furthermore, when the stationary state is continued for a predetermined time period, the size of the AF frame is changed from the small size to the middle size. Hereinafter, the size of the AF frame is in turn changed periodically from large to middle, middle to small, small to middle and so on at each time when the stationary state is continued for a predetermined time period.

In the second uppermost row shown in FIG. 6, when the AF frame in the middle size is a default AF frame and the stationary state is continued for a predetermined time period, the size of the AF frame is changed from the middle size to the large size. Furthermore, when the stationary state is continued for a predetermined time period, the size of the AF frame is changed from the large size to the middle size. Hereinafter, the size of the AF frame is in turn changed periodically from small to middle, middle to large, large to middle and so on at each time when the stationary state is continued for a predetermined time period.

In the third uppermost row shown in FIG. 6, when the AF frame in the small size is a default AF frame and the stationary state is continued for a predetermined time period, the size of the AF frame is changed from the small size to the middle size. Furthermore, when the stationary state is continued for a predetermined time period, the size of the AF frame is changed from the middle size to the large size. Hereinafter, the size of the AF frame is in turn changed periodically from small to middle, middle to large, large to small and so on at each time when the stationary state is continued for a predetermined time period.

In the fourth uppermost row shown in FIG. 6 (the bottom), when the AF frame in the large size is a default AF frame and the stationary state is continued for a predetermined time period, the size of the AF frame is changed from the large size to the middle size. Furthermore, when the stationary state is continued for a predetermined time period, the size of the AF frame is changed from the middle size to the small size. Hereinafter, the size of the AF frame is in turn changed periodically from large to middle, middle to small, small to large and so on at each time when the stationary state is continued for a predetermined time period.

In addition, in FIG. 6, the size of the AF frame is periodically changed in one of three types of the size. However, in addition to this, the size of the AF frame can be periodically changed in one of two or four types or more of the size, for example.

In addition, the patterns for changing the size of the AF frame are not limited to the patterns shown in FIG. 6.

Furthermore, for the size of the AF frame, this scheme may be done in which when the stationary state is continued for a predetermined time period, the size change is started to gradually increase the size to a predetermined maximum size over time, the size reaches the maximum size, the size is then gradually reduced to a predetermined minimum size, the size reaches the minimum size, the size is again increased and so on. In this case, the size change is stopped when the stationary state is released, that is, when the user stops touching on the touch screen 10.

In addition, the size change of the AF frame may be done at each time when a user makes one touch on the touch screen 10, for example.

Furthermore, for the above described manipulations for moving the AF frame and changing the size, in addition to the adoption of either one of them, manipulations may be adopted in an overlapping manner (at the same time) within no occurrence of contradictions.

More specifically, for example, these manipulations can be adopted at the same time: a first manipulation in which a user makes one touch on the touch screen 10 and then the AF frame is moved to the position at which one touch is made (FIG. 4), and another first manipulation in which a user moves a touched position while he/she is touching on the touch screen 10 and then the user moves the AF frame as it follows the touched position (FIG. 5). In this case, when the user touches on the touch screen 10 and then the user moves the touched position while the user is touching on the touch screen 10, the AF frame is first instantaneously moved to the position at which the user is touched, and then the AF frame is moved as it follows the move of the touched position.

In addition, for example, this combination of manipulations can be adopted at the same time to change the size of the AF frame: a first manipulation in which a user makes one touch on the touch screen 10 and then the AF frame is moved to the position at which one touch is made (FIG. 4) and/or another first manipulation in which a user moves a touched position while he/she is touching on the touch screen 10 and then the user moves the AF frame as it follows the touched position (FIG. 5), and then the following manipulation is continued for a predetermined time period: a second manipulation in which the user does not move the touched position (the stationary state) while he/she is touching on the touch screen 10. In this case, the AF frame is moved when the user makes one touch on the touch screen 10, or when the user moves the touched position while the user is touching on the touch screen 10, whereas the size of the AF frame is changed when the user does not move a touched position (the stationary state) while he/she is touching on the touch screen 10.

Furthermore, for example, this scheme may be adopted at the same time in which for a first manipulation, a user moves a touched position while he/she is touching on the touch screen 10 and then the user moves the AF frame as it follows the touched position (FIG. 5) and for the second manipulation, the size of the AF frame is changed at every time when the user makes one touch on the touch screen 10. In this case, the AF frame is moved when the user moves the touched position while the user is touching on the touch screen 10, whereas the size of the AF frame is changed when the user makes one touch on the touch screen.

In addition to this, for example, this scheme may be done in which a user makes one touch on the portion other than the portion where the AF frame is displayed on the touch screen 10 and then the AF frame is moved to the position at which the user makes one touch, whereas the user makes one touch on the portion at which the AF frame is displayed on the touch screen 10 and then the size of the AF frame is changed.

Next, the AF process done by the AF processing part 50 shown in FIG. 3 will be described. The AF process has an AF frame control process done by the AF frame control part 52 and an AF control process done by the AF control part 53.

First, the AF frame control process done by the AF frame control part 52 shown in FIG. 3 will be described with reference to a flow chart shown in FIG. 7.

In addition, the AF frame control process is run periodically. More specifically, when the AF frame control process is ended, it is instantaneously started again from the beginning, for example.

In the AF frame control process, at first, at Step S11, the AF frame control part 52 determines whether a user touches on the touch screen 10 based on manipulation information supplied from the touch detecting part 51.

At Step S11, when it is determined that the user does not touch on the touch screen 10, that is, for example, when the touched position on the touch screen 10 is not included in the manipulation information supplied from the touch detecting part 51 to the AF frame control part 52, the process goes to Step S12. The AF frame control part 52 sets 0 to a status flag, and the process goes to Step S13. The status flag indicates whether the user is touching (has touched) on the touch screen 10, and 0 indicates that the user does not touch on the touch screen 10. At Step S13, the AF frame control part 52 clears the counted value of a counter to 0, and the process goes to Step S22. The counter counts a time period that the user is continuously touching on the touch screen 10.

At Step S22, the AF frame control part 52 sets the value that is set to the status flag to a history flag, and the AF frame control process is ended. The history flag indicates whether the user has touched on the touch screen 10 in the previous AF frame control process. In addition, in the current case, since 0 is set to the status flag at Step S12, 0 is also set to the history flag.

Here, either one of 0 or 1 is set to the history flag. When 0 is set to the history flag, it expresses that the user has not touched on the touch screen 10 in the previous AF frame control process, whereas when 1 is set to the history flag, it expresses that the user has touched on the touch screen 10 in the previous AF frame control process.

On the other hand, at Step S11, when it is determined that the user touches on the touch screen 10, that is, for example, when the touched position on the touch screen 10 is included in the manipulation information supplied from the touch detecting part 51 to the AF frame control part 52, the process goes to Step S14. The AF frame control part 52 sets 1 to the status flag, and the process goes to Step S15. 1 indicates that the user touches on the touch screen 10.

At Step S15, the AF frame control part 52 determines whether the history flag is 0. At Step S15, when it is determined that the history flag is 0, that is, when the user did not touch on the touch screen 10 in the previous AF frame control process but the user touches on the touch screen 10 in the AF frame control process this time, the process goes to Step S16. The AF frame control part 52 moves the AF frame to the position at which the user has touched.

More specifically, when the user touches at a certain position on the touch screen 10, manipulation information including the position at which the user has touched is supplied from the touch detecting part 51 to the AF frame control part 52. The AF frame control part 52 supplies the AF frame information including the position included in manipulation information from the touch detecting part 51 and the current size of the AF frame to the digital signal processing part 24. The digital signal processing part 24 creates an image of the AF frame in accordance with AF frame information from the AF frame control part 52, and supplies it to the touch screen 10. Thus, on the touch screen 10, as shown in FIG. 4, the AF frame is displayed at the position at which the user has touched as the size thereof is maintained.

After that, the process goes from Step S16 to Step S22. The AF frame control part 52 sets the value that is set to the status flag to the history flag, and the AF frame control process is ended. In addition, in the current case, since 1 is set to the status flag at Step S14, 1 is also set to the history flag.

On the other hand, at Step S15, when it is determined that the history flag is 1, that is, when the user has touched on the touch screen 10 in the previous AF frame control process and the user continuously keeps touching on the touch screen 10 in the AF frame control process this time, the process goes to Step S17. It is determined whether the position touched by the user is the same as the touched position in the previous AF frame control process.

At Step S17, when it is determined that the position touched by the user is not the same as the touched position in the previous AF frame control process, that is, when the user moves the touched position while the user is touching on the touch screen 10 and consequently, the current position touched by the user is changed from the touched position in the previous AF frame control process, the process goes to Step S16. As described above, the AF frame control part 52 moves the AF frame to the current position touched by the user.

More specifically, while the user is touching on the touch screen 10, manipulation information including the position at which the user has touched is supplied from the touch detecting part 51 to the AF frame control part 52. The AF frame control part 52 supplies AF frame information including the position included in manipulation information from the touch detecting part 51 and the current size of the AF frame to the digital signal processing part 24. The digital signal processing part 24 creates an image of the AF frame, and supplies it to the touch screen 10 in accordance with the AF frame information from the AF frame control part 52. Thus, on the touch screen 10, as shown in FIG. 5, the AF frame is displayed as the size thereof is maintained, the AF frame moving as though it follows the position touched by the user.

After that, the process goes from Step S16 to Step S22. As described above, the AF frame control part 52 sets the value that is set to the status flag to the history flag, and the AF frame control process is ended.

In addition, in the current case, since 1 is set to the status flag at Step S14, 1 is also set to the history flag.

On the other hand, at Step S17, when it is determined that the position touched by the user is the same as the touched position in the previous AF frame control process, that is, when the user does not move the touched position while he/she is touching on the touch screen 10 and consequently, the current position touched by the user is not changed from the touched position in the previous AF frame control process, the process goes to Step S18. The AF frame control part 52 determines whether the counted value of the counter built therein is greater than (or equal or above) a predetermined value corresponding to a predetermined time period.

At Step S18, when it is determined that the counted value of the counter is below a predetermined value, that is, when the state in which the user does not move the touched position while he/she is touching on the touch screen 10 (the stationary state) is not continued for a time period exceeding a predetermined time period, the process goes to Step S19. The AF frame control part 52 increments the counted value of the counter by 1, and the process goes to Step S22. As described above, the AF frame control part 52 sets the value that is set to the status flag to the history flag, and the AF frame control process is ended. In addition, in the current case, since 1 is set to the status flag at Step S14, 1 is also set to the history flag.

In addition, at Step S18, when it is determined that the counted value of the counter is greater than a predetermined value, that is, when the state in which the user does not move the touched position while he/she is touching on the touch screen 10 (the stationary state) is continued for a time period exceeding a predetermined time period, the process goes to Step S20. The AF frame control part 52 changes the size of the AF frame.

More specifically, when the user does not move the touched position while he/she is touching on the touch screen 10, manipulation information about the touched position not changed is supplied from the touch detecting part 51 to the AF frame control part 52. The AF frame control part 52 supplies the touched position including in manipulation information from the touch detecting part 51 and AF frame information including the size different from the current size of the AF frame to the digital signal processing part 24. The digital signal processing part 24 creates an image of the AF frame in accordance with the AF frame information from the AF frame control part 52, and supplies it to the touch screen 10. Thus, on the touch screen 10, as shown in FIG. 6, the AF frame changed in the size is displayed as the position thereof is maintained.

After the process at Step S20, the process goes to Step S21. The AF frame control part 52 clears the counted value of the counter to 0, and the process goes to Step S22.

At Step S22, as described above, the AF frame control part 52 sets the value set to the status flag to the history flag, and the AF frame control process is ended. In addition, in the current case, since 1 is set to the status flag at Step S14, 1 is also set to the history flag.

According to the AF frame control process shown in FIG. 7, as described in FIG. 4, when the user makes one touch on the touch screen 10, the process is performed in order of Steps S11, S14, S15 and S16. Consequently, at Step S16, the AF frame is moved to the position at which one touch is made.

Furthermore, when the user touches on the touch screen 10 and then the user moves the touched position, the process is performed in order of Steps S11, S14, S15, and S16 at the time when the user touches on the touch screen 10. Consequently, at Step S16, the AF frame is moved to the position at which the user has touched. Then, in accordance with the move of the touch after that, the process is performed in order of Steps S11, S14, S15, S17 and S16. Consequently, as described in FIG. 5, at Step S16, the AF frame is moved as it follows the touched position.

On the other hand, when the user does not move the touched position while he/she is touching on the touch screen 10, the process is performed in order of Steps S11, S14, S15, S17 and S18. Furthermore, at each time when a predetermined time period has elapsed, the process at Step S20 is performed. Consequently, at every time period while the state in which the user does not move the touched position while he/she is touching on the touch screen 10 (the stationary state) is continued for a predetermined time period, as described in FIG. 6, the size of the AF frame is changed.

Therefore, the user can move the AF frame to a given position only by making one touch on the touch screen 10, or by moving the touched position while he/she is touching on the touch screen 10. Furthermore, the user can change the size of the AF frame only by keeping touching on the touch screen 10 without moving the touched position. Therefore, operational ease of setting the AF frame can be improved.

Next, the AF control process done by the AF control part 53 shown in FIG. 3 will be described with reference to a flow chart shown in FIG. 8.

In addition, the AF control process shown in FIG. 8 is run periodically, for example, as similar to the AF frame control process shown in FIG. 7. More specifically, when the AF control process is ended, it is instantaneously started again from the beginning, for example.

In the AF control process, at first, at Step S1, the AF control part 53 extracts image data inside the AF frame specified by AF frame information outputted from the AF frame control part 52 in data of an image taken by the CCD 21 supplied from the digital signal processing part 24 (hereinafter, properly called the AF frame image data), the process goes to Step S2.

The AF control part 53 calculates contrast information showing contrast such as high frequency components of the AF frame image data.

Then, the process goes from Step S2 to S3. The AF control part 53 controls the focus of the digital camera shown in FIG. 2 based on the contrast information, that is, it creates a focus control signal that controls the focus based on the contrast information, and supplies it to the motor driver 32 (FIG. 1), and the AF control process is ended.

Here, the motor driver 32 drives the actuator 33 in response to the focus control signal from the AF control part 53. Thus, the focus lens of the lens part 1 is moved in the direction in which the high frequency component of the AF frame image data is increased.

In addition, in the embodiment, the CPU 26 is allowed to run the program to perform the AF process. The AF process may be done by hardware for exclusive use in addition to this.

Furthermore, the process steps describing the program to run various processes by the CPU 26 are not necessarily processed in a time series along the orders described in the flow charts, which also include processes run in parallel or separately (for example, parallel processing or processing by an object).

In addition, the program may be processed by a single CPU, or may be done by distributed processing by a plurality of CPUs.

Furthermore, in the embodiment shown in FIG. 2, a CCD is adopted as a photoelectric conversion device which receives the light from the subject and performs photoelectric conversion. However, for the photoelectric conversion device, a device such as a CMOS imager may be adopted, in addition to this.

In addition, the manipulation on the touch screen 10 (the touch panel 12) done by the user may be done by the user's finger, or done by a pen for touching etc.

Furthermore, for example, in FIG. 5, the AF frame is moved in such a way that the barycenter position of the AF frame is matched with the position touched by the user. However, the AF frame may be moved in such a way that the upper left peak of a rectangular AF frame is matched with the position touched by the user, in addition to this.

In addition, in the embodiment, the position of the AF frame is moved, or the size of the AF frame is changed in accordance with the touch on the touch screen 10 by the user. However, the shape of the AF frame may be changed in addition to the move of the position of the AF frame or the change in the size of the AF frame. More specifically, for example, when the user touches at the position of the side or the peak of the rectangular AF frame and moves the touched position, the shape of the AF frame can be changed, not moving the position of the AF frame in accordance with the move. More specifically, when the user touches at the position other than the side or the peak of the AF frame and moves the touched position, the position of the AF frame can be moved in accordance with the move, whereas when the user touches at the position of the side or the peak of the AF frame and moves the touched position, the shape of the AF frame can be changed in accordance with the move.

Furthermore, in the embodiment, the AF frame used for focus control is controlled in accordance with the manipulation of the touch screen 10 by the user. However, in addition to this, for example, a frame (AE (Auto Exposure) frame) which defines the area of an image for use in exposure control may be controlled in accordance with the manipulation of the touch screen 10 by the user.

In addition, in accordance with the manipulation of the touch screen 10 by the user described above, the modes of the digital camera may be changed.

Furthermore, the AF process can be adapted to the case in which moving images are taken by a video camera and other devices, in addition to the case in which a still image is taken by the digital camera and other devices.

In addition, the embodiment of the invention is not limited to the embodiment described above, which can be modified variously within the scope of the invention, not deviating from the teachings.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus, comprising:
   an imaging module which takes an image;
   a display module which displays the image taken by the imaging module;
   a touch panel configured integrally with the display module and manipulatable by a user;
   a focus frame control module which controls a focus frame in accordance with a manipulation of the touch panel by the user, the focus frame being set at a given position on the image displayed on the display module and being used for focus control wherein the focus frame control module is enabled for a timed touch setting of focus frame size; and
   a focus control module which controls focus based on an image inside the focus frame on the image displayed on the display module.

2. The image pickup apparatus according to claim 1, wherein, when the user touches the touch panel, the focus frame control module moves the focus frame on the image displayed on the display module to a position at which the user touches on the touch panel.

3. The image pickup apparatus according to claim 1, wherein, when the user moves a touched position while touching the touch panel, the focus frame control module moves the focus frame in accordance with the movement of the touched position.

4. The image pickup apparatus according to claim 3, wherein the display module displays the focus frame and the image taken by the imaging module.

5. The image pickup apparatus according to claim 1, wherein the focus frame control module changes the size of the focus frame every time the user touches the touch panel.

6. The image pickup apparatus according to claim 1, wherein the focus frame control module changes the size of the focus frame every time a state in which the user is touching the touch panel is continued for a predetermined time period.

7. The image pickup apparatus according to claim 1, wherein the focus frame control module moves the focus frame in accordance with a first manipulation of the touch panel by the user, and changes the size of the focus frame in accordance with a second manipulation of the touch panel by the user.

8. The image pickup apparatus according to claim 7, wherein:
   the first manipulation is a manipulation in which the user moves a touched position while touching the touch panel, and
   the second manipulation is a manipulation in which the user keeps touching the touch panel without moving the touched position.

9. A control method of an image pickup apparatus having an imaging module which takes an image; a display module which displays the image taken by the imaging module; and a touch panel configured integrally with the display module and manipulatable by a user, the method comprising:
   controlling a focus frame in accordance with a manipulation of the touch panel by the user, the focus frame being set at a given position on the image displayed on the display module and being used for focus control, wherein the controlling the focus frame enables a timed touch setting of focus frame size; and
   controlling focus based on an image inside the focus frame on the image displayed on the display module.

10. A program which runs a process by a computer that controls an image pickup apparatus having an imaging module which takes an image; a display module which displays the image taken by the imaging module; and a touch panel configured integrally with the display module and manipulatable by a user, the process comprising:
    controlling a focus frame in accordance with a manipulation of the touch panel by the user, the focus frame being set at a given position on the image displayed on the display module and being used for focus control, wherein the controlling the focus frame enables a timed touch setting of focus frame size; and
    controlling focus based on an image inside the focus frame on the image displayed on the display module.

11. The method of claim 1 wherein the focus frame control module is enabled for a single tap touch setting of the focus frame location.

12. The method of claim 1 wherein the size of the focus frame is toggled to a different pre-determined frame size upon detection of a time counter exceeding a threshold during an extended touch of the touch panel that maintains a consistent touch location.

13. The method of claim 1 wherein the focus frame control module is enabled for a trace touch setting of the focus frame location while maintaining the focus frame in a constant size.

* * * * *

UNITED STATES PATENT AND TRADEMARK OFFICE
CERTIFICATE OF CORRECTION

PATENT NO.        : 7,781,710 B2
APPLICATION NO.   : 11/481479
DATED             : August 24, 2010
INVENTOR(S)       : Higashino Page 1 of 1

It is certified that error appears in the above-identified patent and that said Letters Patent is hereby corrected as shown below:

In the Claims

In claim 11, column 18, line 42 replace "method" with --image pickup apparatus--.

In claim 12, column 18, line 45 replace "method" with --image pickup apparatus--.

In claim 13, column 18, line 50 replace "method" with --image pickup apparatus--.

Signed and Sealed this
Thirteenth Day of August, 2013

Teresa Stanek Rea
*Acting Director of the United States Patent and Trademark Office*